Oct. 26, 1965  G. C. ELLERBECK  3,214,094
CALCULATING MACHINE
Filed Jan. 20, 1964  8 Sheets-Sheet 1

FIG-1

INVENTOR
GRANT C. ELLERBECK
BY
ATTORNEY

Oct. 26, 1965  G. C. ELLERBECK  3,214,094
CALCULATING MACHINE
Filed Jan. 20, 1964  8 Sheets-Sheet 2

FIG-2

FIG_3

FIG_6

Oct. 26, 1965  G. C. ELLERBECK  3,214,094
CALCULATING MACHINE
Filed Jan. 20, 1964  8 Sheets-Sheet 7

FIG_8

FIG_7

United States Patent Office 3,214,094
Patented Oct. 26, 1965

3,214,094
CALCULATING MACHINE
Grant C. Ellerbeck, San Leandro, Calif., assignor to
Friden, Inc., a corporation of Delaware
Filed Jan. 20, 1964, Ser. No. 338,869
7 Claims. (Cl. 235—63)

INDEX

| | Column |
|---|---|
| (I) Customary Construction | 2 |
|   (1) Selection mechanism | 3 |
|   (2) Actuator | 3 |
|   (3) Register | 3 |
|   (4) Shift mechanism | 3 |
|   (5) Multiplication | 4 |
| (II) Chain Discount Mechanism | 5 |
|   (1) Stop pins and cooperating bail | 6 |
|   (2) Setting stop pins | 7 |
|   (3) Restore set stop pins | 7 |
|   (4) Operating multiplication stop mechanism | 8 |

This invention relates to a calculating machine utilizing a multiplication storage mechanism, such as that shown in the patents to Friden, Nos. 2,371,752 of March 20, 1945, and 2,399,917 of May 7, 1946, and provides means whereby two or more small multiplier factors may be stored in the multiplier storage register and used to control a similar plurality of discrete multiplication operations in sequence.

The main purpose of the present invention is to provide a "chain discount" mechanism for controlling a plurality of sequential multiplication operations with the various multiplier factors stored in the multiplier register. By "chain discount" is meant performing a series of multiplication operations using relatively small multiplier factors. It gets its name from the fact that most such operations are in the preparation of statements in which a price is subject to two or more discounts. Most sellers prefer to list a series of discounts, which are figured consecutively, in each case using the discounted total as the basis for the next discount. Thus, a discount of 25%, 10% and 7% is not a discount of 42% but of 33.04%, for the 10% discount is figured on 80% of the stated value, etc. Heretofore these various discounts have either had to be entered into the machine separately, and the operations performed individually, one operation at a time, or the operator computed the total discount (33.04) and used that as a factor without showing the intermediate values. The primary purpose of the present invention is to provide a means whereby in a machine, such as those disclosed in the two Friden patents above-mentioned (or the modifications thereof more recently shown in the patents to Plunkett, No. 2,935,254 of May 3, 1960, or Malavazos, No. 3,090,554 of May 21, 1963), in which the various discounts (the 25%, 10% and 7% in the above example) are entered in inverse order into the multiplier storage register as separate factors. Thereafter the first depression of the multiply key will cause the computation of the first discount of 25%; the second depression of a multiply key will cause a computation using the second discount of 10%; and the third depression of a multiply key will effect a third computation using the third discount of 7%—all as discrete products which may be separately listed. It is assumed that such a mechanism would normally be used with a repeat multiplier mechanism of the type shown in the patents to Ellerbeck, No. 2,794,595 of June 4, 1957, or Plunkett et al., No. 2,824,695 of February 25, 1958.

The primary object of the present invention is to provide an improved chain discount device for a multiplication mechanism of the type shown in the Friden patents above-mentioned.

Another important object of the present invention is to provide a chain discount mechanism in which discounts of a different number of digits (for example, 25%, 12.5% and 5%) can be selected by the operator.

These and other objects of the present invention will be readily apparent to those skilled in the art from the following description of the preferred embodiment of the invention taken in connection with the accompanying drawings in which.

(I) CUSTOMARY CONSTRUCTION

The machine with which the present invention is preferably associated has been shown and described so often that it is believed unnecessary to do more than very briefly sketch the pertinent mechanisms at this time. The patents mentioned above are particularly pertinent to such a description of well-known mechanisms, as is also the patent to Friden, No. 2,229,889 of January 28, 1941.

Figure 2:
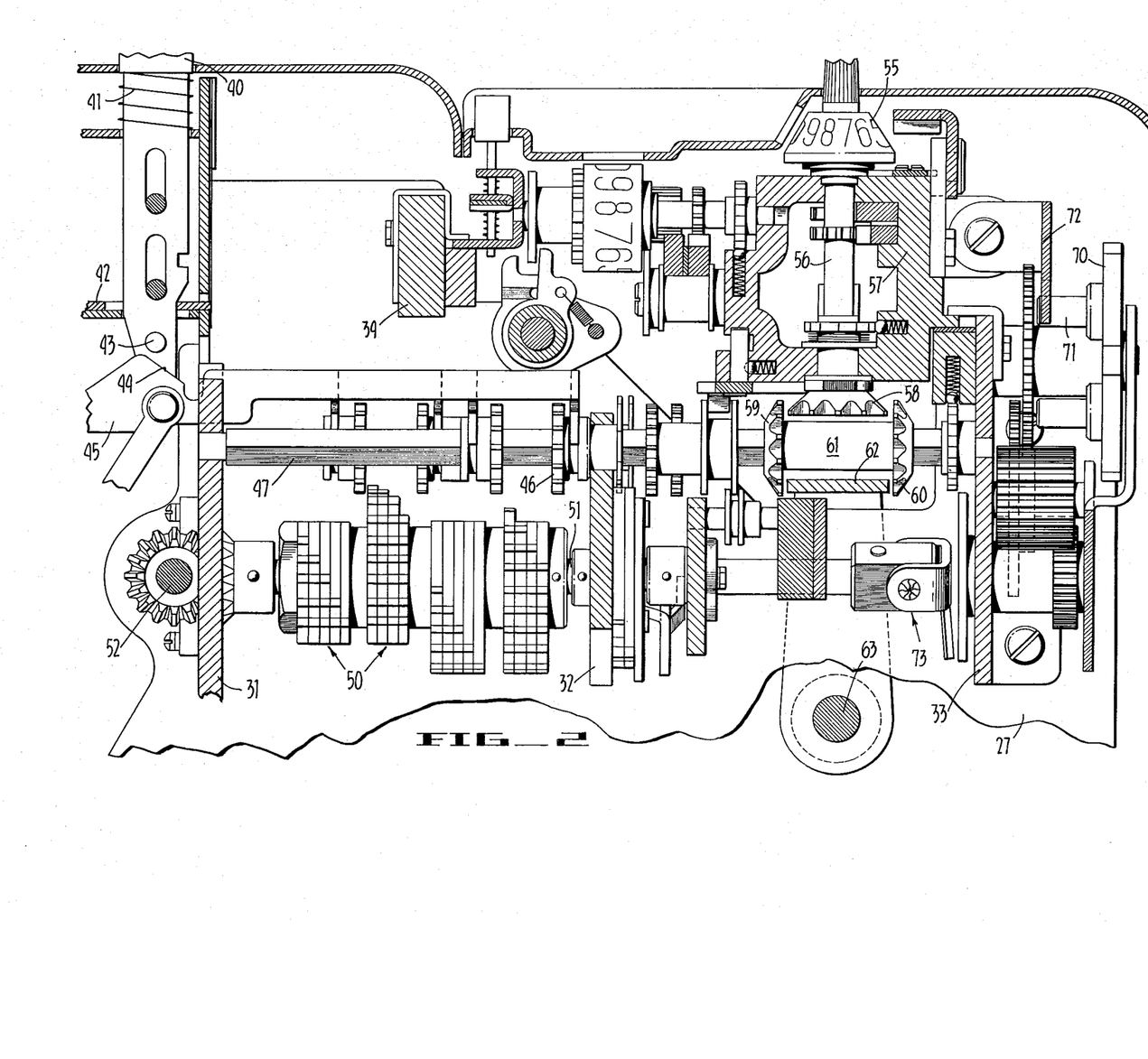
FIG. 2 is a cross-sectional view showing a portion of the selection mechanism, the actuating mechanism and the registers of the machine shown in FIG. 1.
Figure 3:
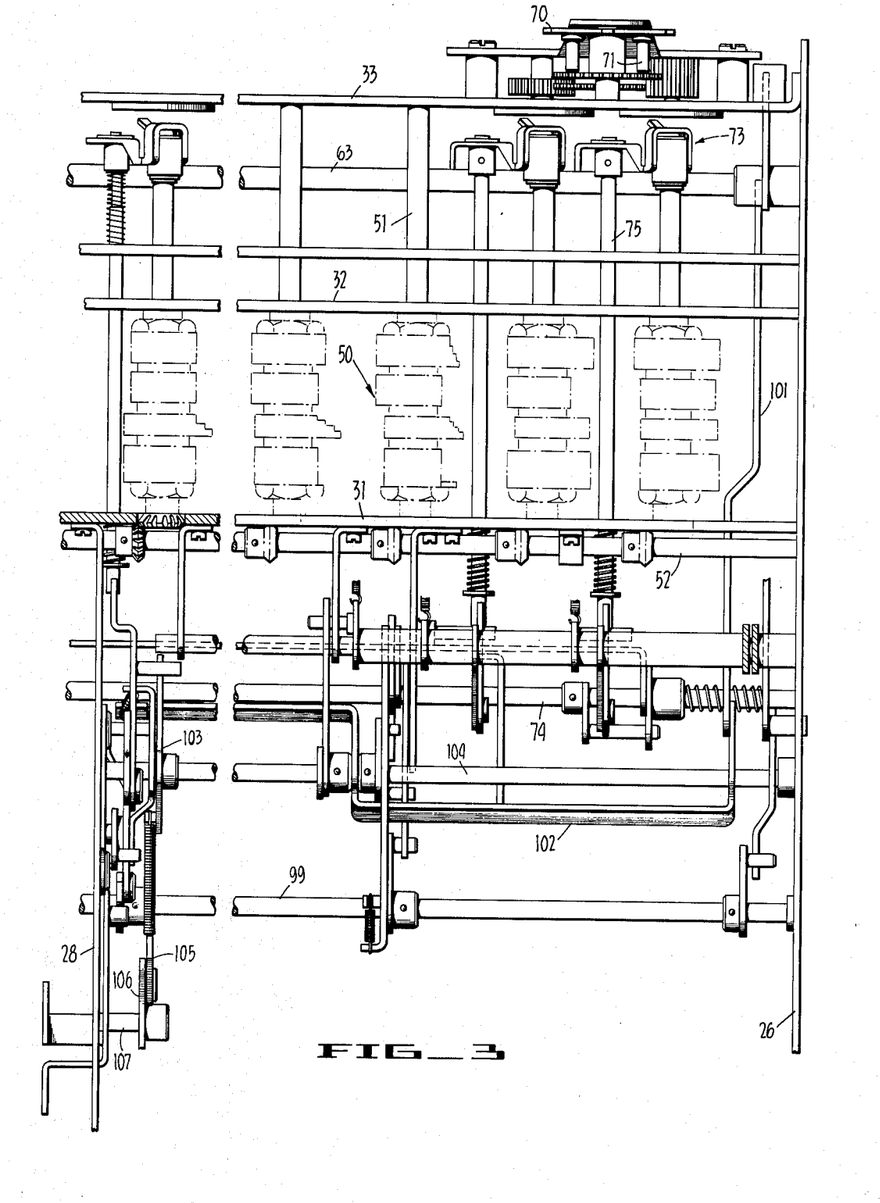
FIG. 3 is a cross-sectional plan view of the machine shown in FIGS. 1 and 2, showing particularly the carriage shifting and register clearing mechanisms and the means for initiating a multiplication operation when the carriage has been returned to its home position.
Figure 4:
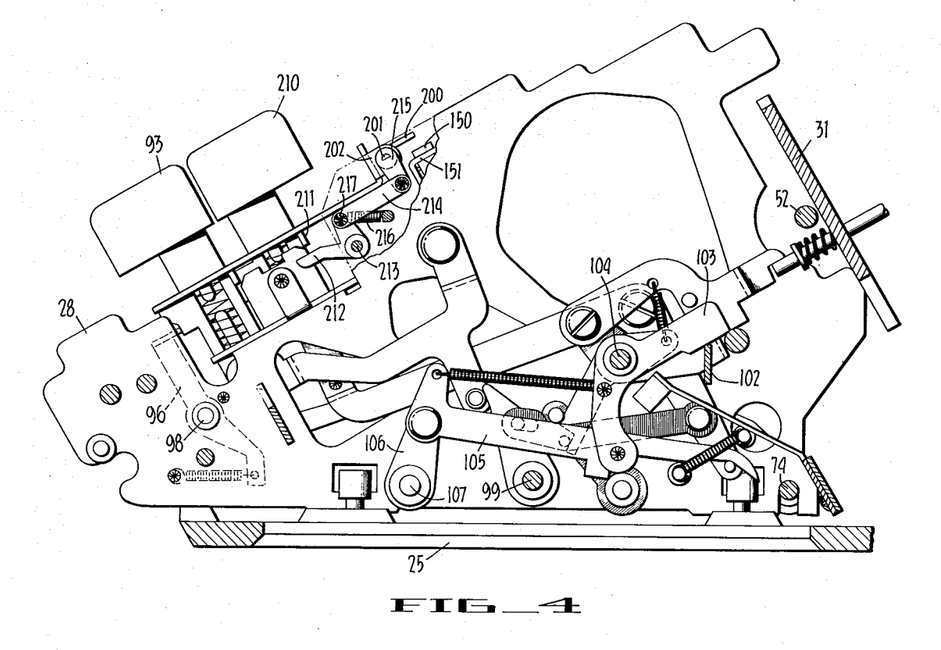
FIG. 4 is a right side view of the multiplier mechanism showing particularly the means for initiating multiplication after the carriage has been returned to its home position.
Figure 5:
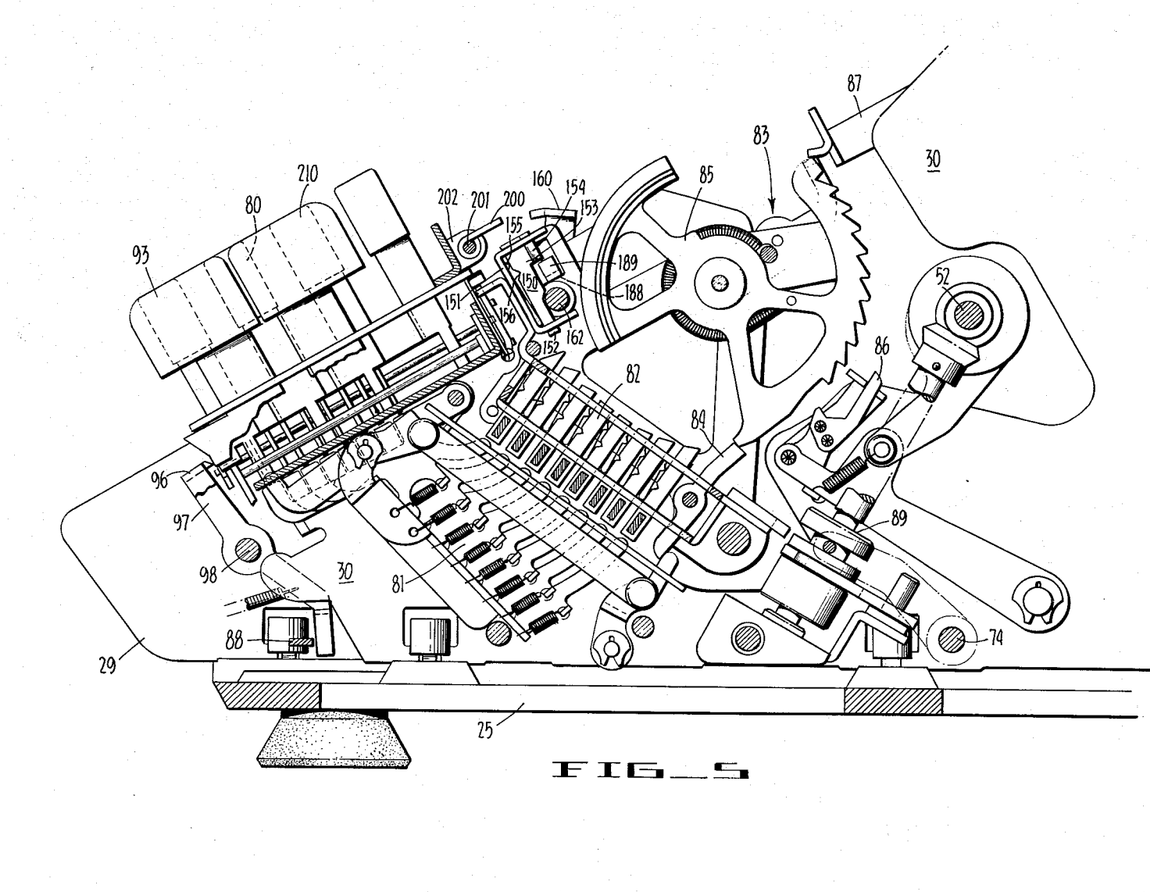
FIG. 5 is a right-hand cross-sectional view through the multiplier mechanism.
Figure 6:
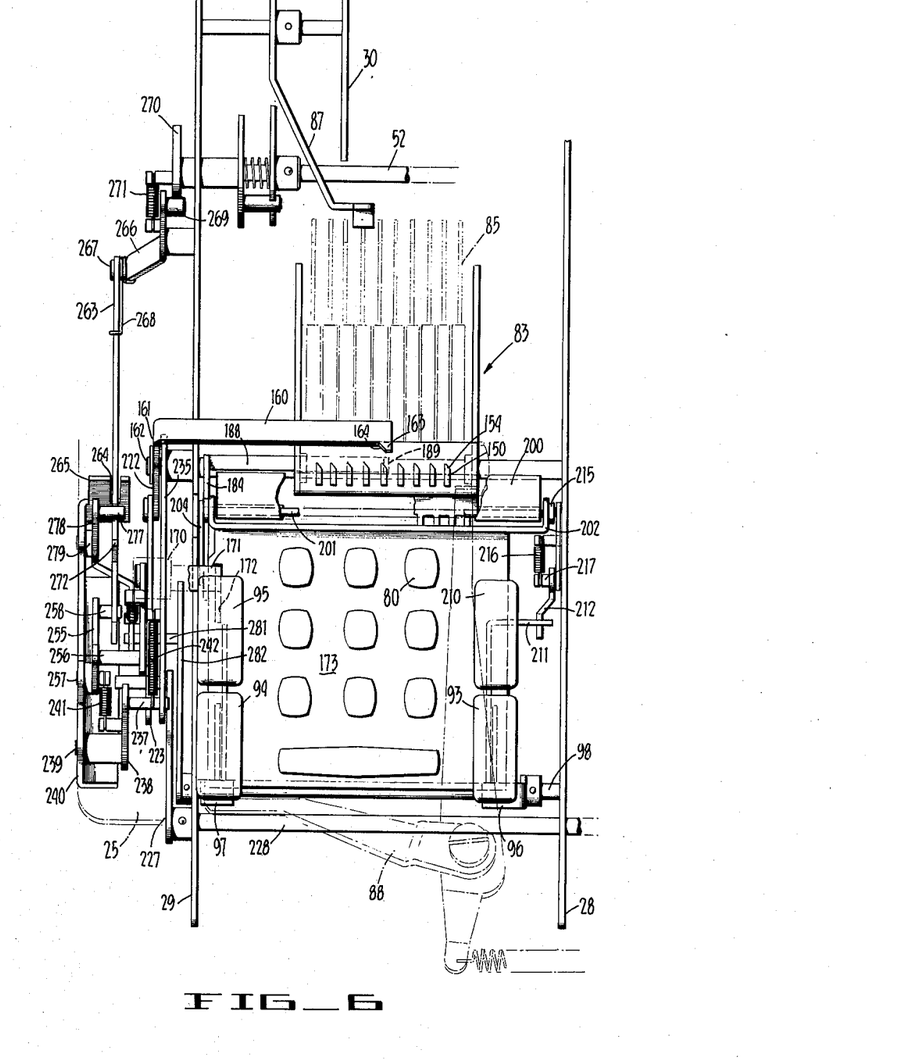
FIG. 6 is a plan view of the multiplier mechanism shown in FIG. 5 and showing mechanism of the present invention.

It can be noted that the machine is mounted upon a frame which normally comprises a base plate 25 (FIGS. 4 and 5), a right side frame 26 (FIG. 3), a left side frame 27 (FIG. 2), an intermediate frame plate 28 (FIGS. 3, 4 and 6), a left side control plate 29 (FIGS. 5 and 6 to 8) and an auxiliary frame plate 30 (FIGS. 5 and 6). The frame plates are rigidly affixed to the base plate 25 by the usual means, and the right side frame 26 and the left side frame 27 are rigidly interconnected by means of crossbars 31, 32, 33 and 34 (FIGS. 2 and 3). Most of the operating mechanisms are mounted upon the framing composed of these side frames and crossbars.

Figure 1:
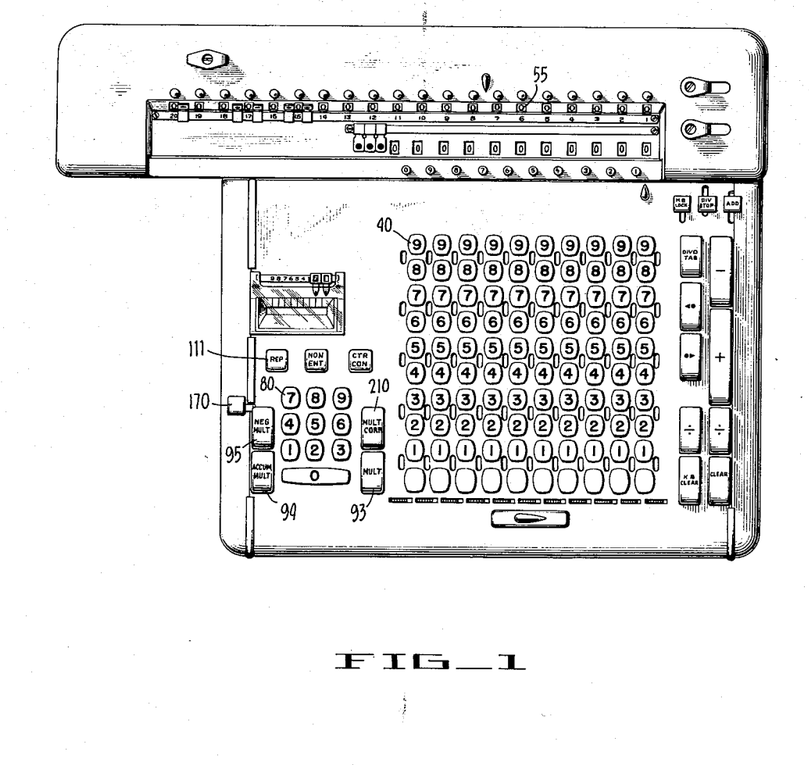
FIG. 1 is a plan view of the machine preferred for the exemplification of the invention.

(1) Selection mechanism (FIGS. 1 and 2)

The selection mechanism is of the type shown in the various patents mentioned, and includes an ordinal array of value keys 40, which are arranged in value banks as shown in FIG. 1. Each of these keys is normally biased to a raised and inoperative position by any suitable means, such as spring 41 (FIG. 2). When depressed to a value position, the key 40 is latched therein by a normal latching slide 42. A pin 43 on the lower end of the key stem is adapted to engage the appropriate one of the incrementally inclined cam faces 44 of a V-notch, or selection, bar 45. In the preferred embodiment of the present machine there are two such selection bars 45 in each order of the keyboard, one serving the "1" to "5" keys and the other serving the "6" to "9" keys. The rear ends of each selection bar 45 is formed with a laterally extending yoke engaging an annular notch in the hub of the corresponding selection gear 46. In each order, the two selection gears 46 are slidably mounted upon a common selection, or square, shaft 47 which is journalled in the crossbars 31, 32 and 33.

(2) Actuator (FIGS. 2 and 3)

The actuator shown is that of the well-known Thomas-type machine and includes, in each order, a mutilated drum actuator 50 which, in the preferred form of the invention, is divided into two sections, one to serve the "1" to "5" keys and the other to serve the "6" to "9" keys. Preferably two such drums 50 are mounted on a common actuator shaft 51 which lies between each pair of orders, and carries one drum 50 serving the right-hand order and another drum serving the left-hand order, as shown. All of the actuator shafts 51 are driven in unison from a common drive shaft 52, driven in the usual way through a clutch (not shown). It is well understood in the art that the translation of the selection gears 46 along their respective shafts 47 places the selection gear in the plane of a number of teeth on the drum 50 corresponding to the value key depressed, so that the rotation of the main drive shaft 52 is operative to differentially rotate the various selection gears 46 in accordance with the values placed in the keyboard.

(3) Register (FIG. 2)

Differential rotation of the ordinal selection shafts 47 is effective to set corresponding values into an accumulator register comprising a plurality of ordinally arranged dials 55. These various register dials 55 are rigidly secured to ordinally arranged shafts 56 which are journalled in a carriage frame bar 57. The lower end of each shaft 56 carries a gear 58 rigidly mounted thereon, which gear registers with either a plus gear 59 or a minus gear 60 which are formed integrally on a spool 61. Normally the spool 61 lies in the intermediate position shown in FIG. 2 and hence neither gear registers with the accumulator gear 58. However, the spool 61 can be shifted rearwardly to cause additive operation of the accumulator dials 55 or forwardly to effectuate subtractive registration in the accumulator by the usual means of a digitation control bar 62 mounted on a transverse shaft 63. It is well-known in the art that the accumulator is shiftable with respect to the selection mechanism.

(4) Shift mechanism (FIGS. 2 and 3)

In the machine shown in the drawings, the carriage is shifted by a mechanism described in the patent to Friden, No. 2,313,817 of March 16, 1943, as modified by the patents to Matthew, Nos. 2,636,678 of April 28, 1953, and 2,679,916 of June 1, 1954. It is, therefore, believed unnecessary to describe the shifting mechanism in detail but it can be noted that the mechanism does include a shift plate 70 (FIGS. 2 and 3), the pins 71 of which engage slots in a shift rack 72 attached to the frame bar 57. The shift plate 70 is given increments of rotation with each cycle of operation through a gearing shown in FIGS. 2 and 3 but which need not be described as it is adequately described in the patents mentioned. It can be noted, however, that in multiplication the right shift clutch 73 is operated between each ordinal series of operations by the rocking of a shaft 74 (FIGS. 3 and 4). This shaft is effective to longitudinally shift a clutch control rod 75 to the rear and hence actuate the right shift clutch 73 to cause a single right shift of the carriage.

It is assumed that any machine with which the present invention would be associated would include the various mechanisms common to calculating machines, such as mechanisms for clearing the accumulator dials, a counter register and means for clearing the same, means for controlling the operation of the digitation control shaft 63 in various operations, shifting the carriage, and the like. Since these various mechanisms are not affected by the operation of the present invention it is believed unnecessary to describe them, reference being made to the patents above-mentioned for descriptions of such devices.

(5) Multiplication (FIGS. 4 to 7)

The preferred embodiment of the present invention utilizes the multiplier mechanism shown in the patents to Friden, Nos. 2,371,752 and 2,399,917, already mentioned. The multiplier mechanism is preferably placed in the lower left-hand corner of the frame of the machine, as shown in FIG. 1, and comprises ten value keys 80 arranged as shown. These keys are mounted in a frame that extends between the intermediate frame plate 28 and the left side control plate 29 (FIGS. 4, 5 and 6). The depression of any one of these keys is operative, through a corresponding bellcrank 81 (FIG. 5), to set a corresponding pin 82 mounted in an ordinal array in a pin box carried by a multiplier carriage 83. The depression of a value key 80 also simultaneously operates a zero latch 84 to enable a multiplier storage segment 85 to escape to a value position determined by the projected pin 82. The operation of the value keys 80 is also effective to operate an escapement mechanism for the multiplier carriage, not fully shown herein, which is fully described in the patents mentioned.

During the multiplication operation the segment 85 in the operative order is returned to a "0" position by means of a cyclically operated feed pawl 86 (FIG. 5) driven synchronously from the main drive shaft 52. When the operative segment reaches its "0" position, it operates a shift control lever 87 that is effective, by means not shown herein but fully described in the patents mentioned, to rock the shift control shaft 74 to cause a right shift of the accumulator carriage and simultaneously a shift of the multiplier carriage 83 a single order to the right and to resume the multiplication operation in the adjacent order.

Normally the multiplier carriage 83 is in a home position, one ordinal spacing of the pins 82 and storage segments 85 to the right of the operative position of the multiplier unit, i.e., one ordinal space to the right of the feed pawl 86. As values are inserted into the storage register the carriage 83 is escaped a single order to the left. This continues until the multiplier value has been inserted into the storage register. Then, in multiplication, the carriage is returned one step toward its home position at the end of each ordinal series of operations of the machine. The shifting of the carriage 83 to the left is controlled by the spring-powered bellcrank 88 shown in phantom in FIG. 6; and the return of the carriage toward the home position by a feed pawl 89 (FIG. 5). The return of the carriage to its home position is effective to terminate the operation; and, normally, to restore the various segments 85 to their "0" latched position.

Multiplication operations are controlled by the depression of one of the three multiply control keys: a normal multiply key 93 (which initiates a clearing operation and a shift of the accumulator register to the left-hand position shown in FIG. 1 as a preliminary program to additive multiplication); an accumulative multiple key 94 (which initiates an additive multiplication operation including shifting of the accumulator register but blocking operation of the register clearing mechanism); and a subtractive multiply key 95 (which operates the machine through the multiplication program in a subtractive direction while blocking clearing of the keyboard). The operation of these keys is fully described in the Friden multiplier patents above-mentioned, so that the mechanisms which they operate to control the various multiplying operations will not be described.

It is sufficient to note that these keys are latched in a depressed position by means of a pair of latching arms 96 (FIGS. 4, 5 and 6) and 97 (FIGS. 5, 6 and 7), both of which are rigidly mounted on a common shaft 98. The two latches are rocked to a releasing position as the multiplier carriage 83 is shifted to its home, or inoperative, position by means of the arm of bellcrank 88 (FIG. 6) engaging the tail of latch arm 97 to rock the two latches (counter-clockwise in FIGS. 4 and 5) to release the depressed key.

Figure 7:
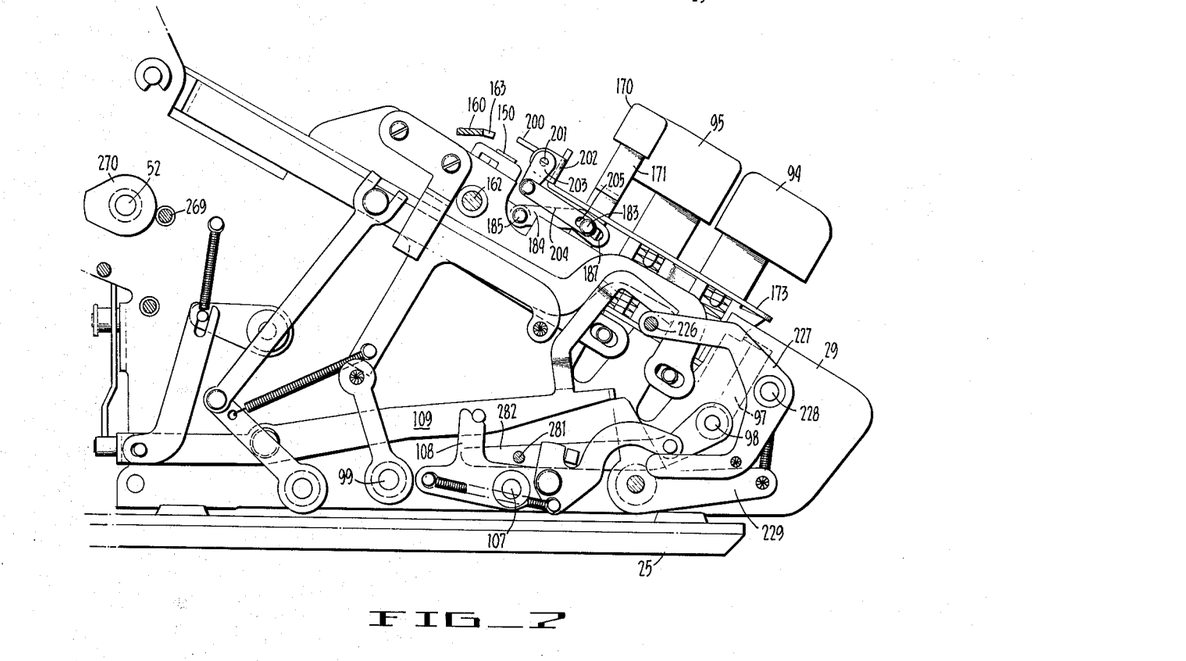
FIG. 7 is a partial left side view of the multiplication mechanism of the machine shown in FIG. 1 showing particularly the normal multiplication mechanism.

It should perhaps also be noted that depression of any one of these three keys is effective to rock an initiating shaft 99 (FIGS. 3, 4 and 7) to initiate machine operation. It has been mentioned that the depression of one of the multiply control keys 93, 94 and 95 is effective to initiate machine operation and to program a left shift of the accumulator to return it to the home position shown in FIG. 1. When this position is reached, a customary shift-terminating mechanism is operated which, in operations other than multiplication, is not only effective to disable the shifting mechanism but also to stop machine operation. In multiplication, this override mechanism, which includes link 101 (FIG. 3) and bail 102, is effective to initiate multiplication. In the form shown in these figures, the override bail 102 underlies a bellcrank 103 (FIG. 4) which is pivotally mounted on a transverse shaft 104. A pin on the depending arm of the bellcrank is embraced in a notch formed in an operating link 105. The forward end of this link is pivotally connected to an arm 106 mounted on a multiplier-initiating shaft 107, the left end of which is seen in FIG. 7. The rocking of the bail 102 (upwardly in FIG. 4) rocks the bellcrank 103 to pull the link 105 rearwardly, and hence rocks shaft 107 (clockwise in FIG. 4 and counter-clockwise in FIG. 7). Such rocking of the shaft removes a latch 108 (FIG. 7) from its engagement with a pin on a multiplier-initiating lever 109, permitting the lever to rock under the force of a strong spring (not shown herein). Since the mechanism controlled by the operation of this lever 109 is fully described in the multiplier patents above-mentioned, it is deemed unnecessary to describe it here.

It is assumed that the multiplier storage register of any machine with which the present invention would be associated, would include means for setting the multiplier mechanism for repeat operation. In most instances chain discount operations will be reapeated over and over, so that some repeat mechanism is desirable. For this reason I indicate sketchily a repeat multiplier mechanism of the type shown in the patent to Friden et al., No. 2,376,997. Such a repeat operation is normally controlled by the forward movement of the repeat key 111 (FIG. 1). However, it is believed unnecessary here to describe the mechanism controlled thereby or its operation.

(II) CHAIN DISCOUNT MECHANISM

The present invention relates to what can most aptly be called a "chain discount" mechanism. Such a mechanism is one that enables the insertion of a number of multiplier factors into the multiplier storage mechanism 83, to be severally operated in sequence. As already indicated, this usually finds its most extensive usage in the computing of discounts when several are to be applied to a particular figure. In the normal multiplication mechanism heretofore described, the multiplication operation is continued order-by-order, from the lowest order to the highest, in a continual sequence of operations lasting until the carriage has been restored to its home, or inoperative, position. In order to provide a chain discount mechanism, it is necessary to provide an auxiliary means for terminating the multiplication operation at selected points. Obviously, a machine could be constructed in which the stopping points were fixed in the machine at the time of its manufacture, but the present invention shows a preferred form in which the setting of multiplier digits can be controlled at the will of the operator. For example, in the present invention, the chain discount mechanism can be completely disabled so that multiplication proceeds in the usual way. On the other hand, it can be set to stop a multiplication operation after any one of a number of ordinal operations, theoretically from one to nine. Usually, a mechanism of this kind will be set for two or three multiplier factors and hence permit the setting of five or less factors in the multiplier unit for each separate multiplication. Incidentally, it should be noted that I assume that the multiplier storage mechanism carried by the multiplier carriage 83 will contain ten orders of selection segments, so that the present mechanism will provide five two-order multipliers, three three-order multipliers, or two four- or five-order multipliers, or a combination of two, three and four digit multipliers.

(1) *Stop pins and cooperating bail (FIGS. 5, 6 and 10)*

Figure 10:
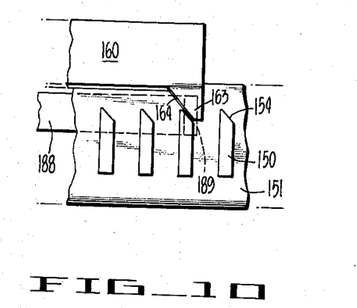
FIG. 10 is an enlarged partial plan view of the chain discount mechanism showing particularly the adjustable stops therefore and the sensing arm operated by such stops.

The mechanism for terminating operation of the multiplier mechanism in an intermediate carriage position is best shown in FIGS. 5, 6 and 10. This mechanism comprises a plurality of stop pins 150 ordinally mounted in a channel 151 mounted on the multiplier carriage 83. These pins are mounted in the plane intermediate each pair of multiplier segments 85, as best shown in FIG. 6. They are shaped substantially as shown in FIG. 5, having a narrow stem 152 extending through slots in the lower flange of the channel 151 and a wider head 153 extending through the upper flange of the channel. The rear face of the head 153 is beveled, as at 154, on the right side (see particularly FIG. 10) to form a camming surface. These pins 150 are detented in either a raised or a lowered position by any suitable means, such as a leaf spring 155 (FIG. 5) set in the channel 151 and having a shaped nose adapted to fit into a detent notch 156 formed in the edge of the pin. Two such notches could be provided, but I have found that one is sufficient if it is so located as to detent the pin in the upper position, gravity normally being sufficient to maintain the pin in its lower position when once the pin is set in the lower position. The operation of the means for lifting the pins to their upper, or operative, position will be described in subsection 2 below; and the means for restoring them will be described in subsection 3 below.

For the moment, it should be noted that cooperating with the stop pins 150 is a sensor 160 (FIGS. 5, 6, 8 and 9). This sensor can be formed as a bail with legs at both ends pivotally mounted on a suitable axis, or it can be made as a half bail, as shown in these figures, in which the left leg only is pivotally supported in the machine by some suitable means, such as the left leg 161 being rotatably mounted on a shaft 162. The sensor 160 carries a forwardly extending nose 163 (FIG. 10) which lies in the plane of the pin 150 ordinally above (i.e., lying between the operative segment 85 and the adjacent segment to the left thereof) the operative order of the multiplier mechanism (i.e., the order opposite feed pawl 86 as shown in FIG. 5). The left side of the nose 163 is beveled, as at 164, to form an angle complementary to the bevel 154 on the pins 150. Normally, the sensor 160 is rocked to the rearward position shown in FIGS. 5 and 6, but when operated as disclosed in subsection 4 below, it is rocked forwardly to the position shown in FIG. 10 in which the bevel 164 of nose 163 lies immediately adjacent and in engagement with the bevel 154 on the ordinally related pin 150. It can be mentioned at this point that as the carriage 83 is shifted to the right at the end of that ordinal series of operations in a multiplication operation, the reaction of the two bevels, or cams, rocks the sensor 160 rearwardly. Such rocking will be utilized to terminate the multiplication operation, as will be described in subsection 4.

(2) *Setting stop pins (FIGS. 11 and 12)*

Figure 11:
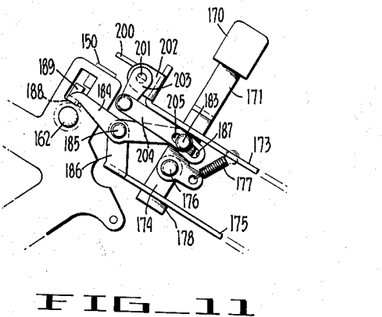
FIG. 11 is a detail of the chain discount setting key in its normal and inoperative position.
Figure 12:
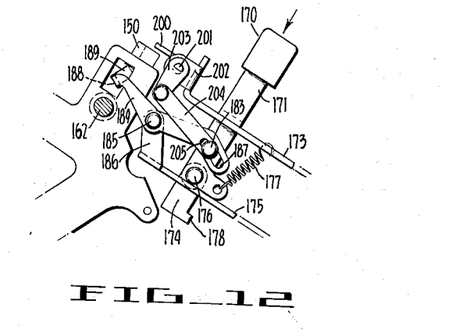
FIG. 12 is similar to FIG. 11 but shows the key depressed to set an adjustable stop.
Figure 13:
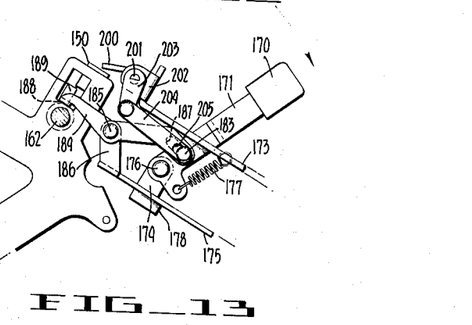
FIG. 13 is similar to FIG. 11 but shows the key rocked to clear the adjustable stops.

Any one of the ordinal pins 150 can be set by the operator after the insertion of a multiplier value into the multiplier carriage 83 by depression of a key 170 (see also FIG. 1). This key, as shown in FIGS. 11, 12 and 13, is mounted on a two-part key stem: An angular stem 171 which extends through an elongated slot 172 (FIG. 6) in the upper frame plate 173 of the multiplier keyboard and a lower section 174 extending through a slot in the lower keyboard frame plate 175 of size corresponding to the lower key stem 174. This construction permits both depression and rocking of the key 170—the two sections 171 and 174 being interconnected by a suitable pin 176. A spring 177 tensioned between seats in the offset end of stem 171 and the upper plate 173 normally biases the key 170 to the upper and upright position shown in FIG. 11—the spring opposing both the depression of the key stem to the lower position shown in FIG. 12 or the rocking of the key to the position shown in FIG. 13. The lower end of the lower section 174 is provided with a toe 178 which engages the underside of the lower frame plate 175 and hence limits the upward motion of the key 170.

The upper portion 171 of the key stem carries a pin 183. Associated with the pin is a rocker 184 which is pivoted at its elbow on a pivot pin 185 carried by a bracket 186 extending upwardly and rearwardly from the lower frame plate 175. The forward end of the rocker 184 is formed with an angular slot 187 which embraces the pin 183. It is obvious that the depression of the key 170 (to move it from a position shown in FIG. 11 to that shown in FIG. 12) rocks the rocker 184 (clockwise from the position shown in FIG. 11 to that shown in FIG. 12). The slot 187 is not only long enough to permit movement of the pin 183 within the slot as the key is depressed from the position shown in FIG. 11 to that shown in FIG. 12, but also long enough to permit the forward rocking of the key 170 as shown in FIG. 13.

The rear end of the rocker 184 carries a rightwardly extending offset ear 188. This ear extends to the right to underlie the pin 150 immediately to the left of the nose 163, as shown in FIGS. 6 and 10. At its right end, the ear 188 carries an upstanding projection 189 (see particularly FIG. 5) which underlies the edge of head 153 of the setting pins 150. Thus, the depression of the key 170, by rocking the bellcrank lever 184 (clockwise in FIGS. 11 and 12), lifts the pin 150 lying immediately to the left of the nose 163, and hence places that pin in its upper and operative position. Then, when the sensor arm 160 is rocked forwardly, the nose 163 (which overlies all of the pins 150 in their lower, or inoperative, positions) will engage the set pin 150 as the carriage is shifted to the right to complete the operation in the immediately lower orders.

(3) *Restore set stop pins (FIGS. 4 to 9 and 11 to 13)*

Any elevated pin may be depressed to its inoperative position by a rocking of the key 170. The depression of the pins 150 is made by rocking a bail 200 (FIGS. 4 to 9 and 11 to 13). This bail is rigidly mounted on a shaft 201 that is journalled in rearwardly extending ears 202 formed on the upper keyboard frame plate 173. An arm 203 (FIGS. 11 to 13) is rigidly secured to the left end of the shaft. A link 204 is pivotally connected to the lower end of arm 203, and its forward end is supported on pin 183 carried by the key stem 171. A short slot 205 (FIGS. 7 and 11 to 13) is formed in the front end of the link 204, the slot being only long enough to permit depression of the key 170 without pulling link 204 to rock bail 200. It will be recalled that the upper portion of the key stem projects through a long slot 172 (FIG. 6) formed in the upper keyboard frame plate 173, so that the key 170 can be rocked from the normal position shown in FIG. 11 to the position shown in FIG. 13. Such rocking of the key 170, as shown in FIG. 13, translates the link 204 forwardly, rocking the arm 203 and bail 200 to the counter-clockwise position shown in this figure. Such operation of the bail depresses any stop pin 150 that is being held in its upper position by its detent spring 155 (FIG. 5).

The bail 200 can also be rocked by the multiply clear key 210 (FIG. 4). As shown in FIGS. 4 and 6, the multiply clear key 210 carries a rightwardly extending ear 211 which is adapted to engage the forwardly projecting leg of a bellcrank 212 that is pivotally mounted on a stud 213 (FIG. 4) riveted to, or otherwise rigidly secured on, the left side of the intermediate frame plate 28. A link 214 is pivotally mounted on the upwardly extending leg of the bellcrank 212 and an arm 215 rigidly mounted on the right end of shaft 201. A spring 216 (FIGS. 4 and 6), between the pin 217 which interconnects the bellcrank 212 and the link 214 and a stud on the frame plate, resiliently biases the assembly, including the bellcrank 212, link 214, and bail 200, to the inoperative position shown in FIGS. 4, 5, 7 to 9, 11 and 12. It is obvious, however, that depression of the multiply clear key 210, as well as the rocking of key 170, is effective to rock bail 200 against the bias of spring 216 to depress any stop pins 150 which may be in an elevated position.

(4) *Operating multiplication stop mechanism (FIGS. 6 to 9)*

It will be recalled that any pin 150 which has been set to its elevated position by depression of key 170 will be operative to rock the bail 160 as the multiplier carriage 83 is shifted from its last operative position. The carriage shifting begins immediately after the shift cycle starts and is completed about halfway through the second quadrant, so that the bail 160 is rocked at approximately the 90° position of the drive shaft 52 in that cycle.

Figure 8:
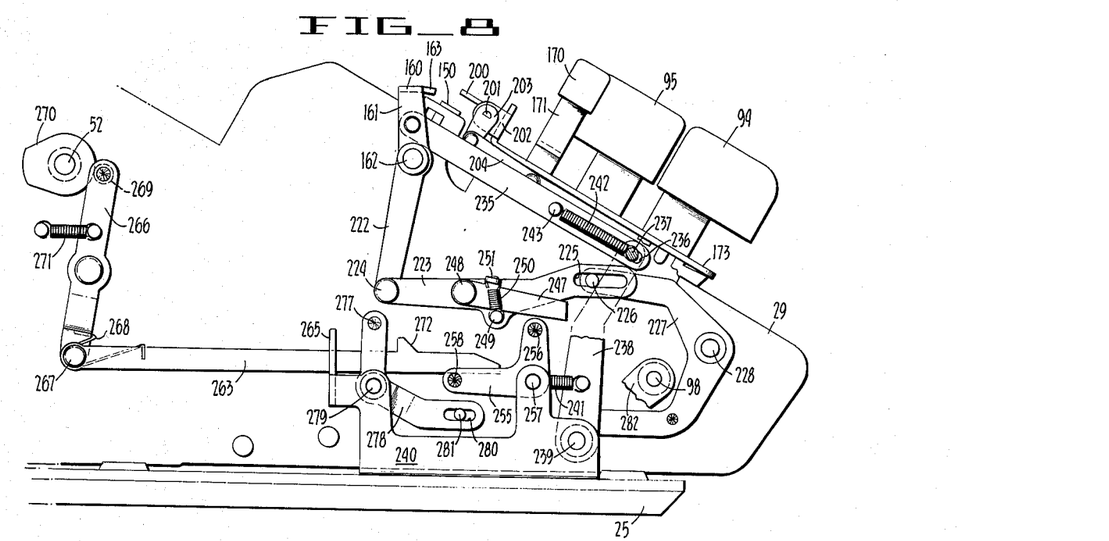
FIG. 8 is a partial side view of the multiplication mechanism, taken from the same plane as that of FIG. 7, showing particularly the parts added to the normal multiplication mechanism to provide for chain discount operation—the parts shown in FIG. 8 being superimposed over the mechanism shown in FIG. 7.
Figure 9:
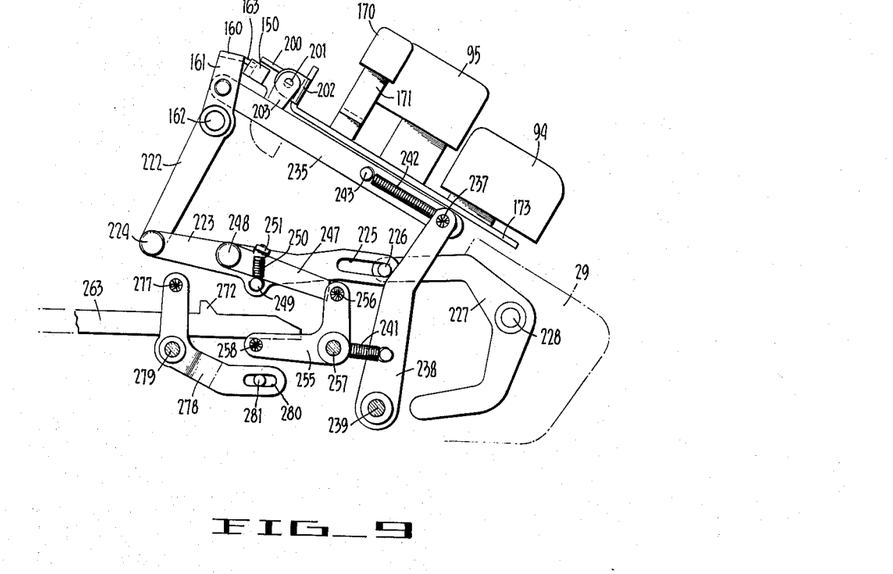
FIG. 9 is similar to FIG. 8 but shows the chain discount mechanism conditioned for operation.

The rocking of the bail, or long ear, 160 is effective to release the multiplier key latches 96 and 97. The mechanism by means of which such rocking of the ear, or bail, 160 is utilized to so release the multiplier key latches 96 or 97 (FIGS. 4 and 5) is best shown in FIGS. 8 and 9. It is apparent that the sensor 160 is mounted on an arm 161 that is pivotally mounted on the left side control plate 29 by any suitable means, such as shaft 162. This arm carries a downwardly extending tail 222. A link 223 is pivotally supported at its rear end on the lower end of the tail 222 by any suitable means, such as pivot stud 224. The forward end of the link 223 is provided with a long slot 225 which embraces a pin 226 mounted on the rear end of the upward leg of a U-shaped bellcrank 227. The bellcrank 227 is affixed to the left end of a shaft 228 which is rocked in multiplication operations as described in the multiplier patents above-mentioned, this bellcrank being used to release one of the latches 229 (FIG. 7) that normally holds the operating link 109 in its inoperative position. In the present instance, the U-shaped bellcrank 227 is also utilized to depress the front end of link 223 whenever a multiplication operation is initiated. This action is shown by a comparison of FIGS. 8 and 9, FIG. 8 showing the parts in their normal, inoperative position and FIG. 9 showing the U-shaped bellcrank in the position it assumes during a multiplication operation.

A second link 235 (FIGS. 8 and 9) is supported on its rear end on the arm 161 supporting the sensor 160. The forward end of the link is formed with a short slot 236 which embraces a pin 237 secured to the upper end of a bent lever 238. The lever 238 is pivotally mounted on the left side of the control plate 29 by any suitable means, such as a pivot stud 239 carried by a bracket 240 mounted on base plate 25. A spring 241 tensioned between the arm 238 and a pivot stud 257 carried by the bracket 240 biases the arm 238 rearwardly (counter-clockwise in FIGS. 8 and 9) and hence resiliently biases the arm 161 and sensor 160 rearwardly, counter-clockwise as shown in FIG. 8. The upper portion of the arm 238 is bent as shown in these figures to provide a cam edge which is engaged by the pin 226 carried by U-shaped lever 227, so that the rocking of the lever 227 to initiate multiplication rocks the arm 238 clockwise against the bias of spring 241. A suitable spring 242 is tensioned between the pin 237 and a stud 243 on the link 235, so that the link 235, and hence sensor 160, is resiliently pulled to the forward position shown in FIG. 9 by the clockwise rocking of arm 238. This connection, however, permits the rocking of sensor 160 and arm 161 (counter-clockwise in FIG. 9), even though the arm 238 is held in its forward position by pin 226. By this means, the sensor bail 160 is pulled resiliently to the forward position shown in FIG. 9 by the initiation of the multiplication operation, and the consequent rocking of lever 227; but can be rocked rearwardly when the nose 163 of the sensor engages an elevated pin 150.

The lower link 223 carries a live interponent 247 which is pivotally mounted on the link 223 by any suitable means, such as pivot stud 248. A pin 249 on the link serves as a stop to prevent rocking of the interponent 247 downwardly from the position shown in FIGS. 8 and 9, and also as a seat for a spring 250 tensioned between the pin 249 and an ear 251 formed on the interponent 247. The forward end of the interponent 247 is formed as a shoulder adapted, when the link 223 is in the lower position shown in FIG. 9, to lie immediately behind a pin 256 secured to the upper arm of a bellcrank 255, as shown in FIGS. 8 and 9. However, when the link is in an inoperative position shown in FIG. 8, the interponent 247 lies above the pin 256; and, hence, any reciprocation of the link would not affect the bellcrank 255.

This bellcrank 255 is pivotally mounted on a suitable pin 257, also carried on the bracket 240. The rearwardly extending leg of the bellcrank 255 is provided with a pin 258 which supports the front end of an operating link 263 to be described in the next paragraph. For the moment, it should be noted that the forward end of the link 263 normally lies in the lower position shown in FIGS. 8 and 9, but when the bellcrank 255 is rocked (clockwise in these figures) by the live interponent 247, the link is lifted to an operative position. The movement of the sensor 160 (rocking counter-clockwise from the position shown in FIG. 9), caused by the engagement of the nose 163 with an elevated pin 150, of course, rocks link 223 and hence the live interponent 247 forwardly to rock the bellcrank 255.

The link 263 reciprocates constantly in all machine operations. The front end of the operating link 263 is supported in a guide slot 264 (see FIG. 6) on a laterally extending ear 265 formed on the rear end of the mounting bracyet 240. The rear end of the link 263 is pivotally mounted on a cam follower lever 266 (FIG. 8) by any suitable means, such as pivot pin 267. A torsion spring 268 mounted on the pin 267 and engaging the link 263 and follower lever 266 biases the link 263 downwardly to the position shown in FIG. 8. The upper end of the follower lever 266 carries a roller 269 that engages the periphery of a cam 270 rigidly mounted on the left end of the main drive shaft 52. The lobe of cam 270 is located in approximately the 180° position of the cam, so that the follower lever 266 is rocked and the operating link 263 is reciprocated at about the midpoint of the cycle. A spring 271 biases the follower lever 266 (in a counter-clockwise direction in FIG. 8) into engagement with the cam 270. Thus, the operating link 263 is cycled at about the midpoint of every machine cycle. Normally, this has no effect on any machine operation as the link 263 is in the lower inoperative position shown in FIG. 8. The only time the link 263 is raised is when the bellcrank 255 is rocked by the rocking of sensor 160, which is caused by the engagement of its nose 163 with an elevated pin 150.

The forward end of the link 263 is formed with a rearwardly facing shoulder 272 adapted, when the forward end of the link is raised, to engage a pin 277 riveted to, or otherwise rigidly secured on, the upper leg of a bellcrank 278. This bellcrank is pivotally mounted by any suitable means, such as pivot stud 279 carried by the bracket 240. The forward leg of the bellcrank 278 is formed with an elongated slot 280 which embraces a pin 281, as shown in FIGS. 8 and 9. The pin 281 is riveted to, or otherwise rigidly secured on, an arm 282 (see FIG. 7) that is rigidly mounted on the latch shaft 98. It is apparent that the link 263 is pulled rearwardly by the operation of cam 270 at about the midpoint of a machine cycle. If the front end of the link 263 has been lifted by the rocking of the bellcrank 255, the shoulder 272 engages pin 277 and hence rocks the bellcrank 278. Such rocking of the bellcrank, through the operation of the slot 280 and pin 281, rocks the delatching arm 282 (clockwise in FIG. 7) to unlatch a depressed multiplier key. The unlatching of the key by the rocking of the latch arm 96 or 97 terminates the machine operation at the end of that cycle, and thereby terminates a multiplication operation in the order determined by the elevation of one of the pins 150.

A subsequent multiplication operation can immediately be performed by depression of a multiply key and reinitiating a multiplication operation. In view of the fact that the multiplier carriage 83 has not been returned to its home position, the multiplier carriage is not adjusted at the start of a new operation, so that the new multiplication begins with the next higher order.

It is to be understood that this invention is not limited to the apparatus of the patents above-mentioned. Manifestly, many modifications and variations of the invention herein set forth may be made by persons skilled in the art without departing from the spirit or scope hereof, and particularly in applying this invention to other commercial machines. Accordingly, the above description is to be considered the preferred embodiment of the invention, and the invention should be considered as not limited thereto but as comprehending other constructions without departing from the spirit of the invention.

I claim:
1. In a calculating machine having a multiplication mechanism including:
   (1) a plurality of ordinally arranged multiplier members for storing a multiplier factor,
   (2) means controlled by said multiplier storage members for sequentially controlling the operation of said machine in a continuous series of ordinal operations in multiplication, and
   (3) means operated by the last-to-be-operated of said members for terminating machine operation,
the combination which comprises:
   (4) an auxiliary means for terminating operation of said machine,
   (5) a settable stop member representative of a preselected ordinal position of said multiplier storage members, and
   (6) means operated by said stop member for operating said auxiliary terminating means.
2. In a calculating machine having a multiplication mechanism including:
   (1) a plurality of ordinally arranged storage members for storing a multiplier factor,
   (2) means controlled by said multiplier storage mem- bers for sequentially controlling the operation of said machine in a continuous series of ordinal operations in multiplication, and (3) means operated by the last-to-be-operated of said members for terminating machine operation, the combination which comprises:

(4) an auxiliary means for terminating operation of said machine, (5) ordinally arranged stop members representative of the ordinal positions of said multiplier storage members, (6) means for setting said stop members from an inoperative to an operative position, and (7) means controlled by an operative one of said members for operating said auxiliary means.

3. In a calculating machine having a multiplication mechanism including:

(1) a plurality of ordinally arranged storage members, (2) an indexing means for inserting values into said storage members, (3) means controlled by an operative one of said storage members for controlling the operation of said machine in a multiplication operation, (4) means for sequentially enabling said storage members to become the operative one of said members, and (5) means operated by the last-to-be-operated of said storage members for terminating machine operation, an auxiliary means for terminating machine operation which comprises the combination of:

(6) a plurality of ordinally arranged terminating members representative of the ordinal position of said storage members, (7) means for setting selected terminating members from an inoperative to an operative position, and (8) means operated by the terminating member in an operative position for terminating operation of said machine whenever the corresponding storage member controls a multiplication operation.

4. In a calculating machine having a multiplication mechanism including:

(1) a plurality of ordinally arranged storage elements, (2) means for inserting values into said multiplier storage elements, (3) means controlled by an enabled one of said multiplier storage elements for controlling the operation of said machine in a multiplication operation, (4) means for sequentially enabling said storage elements, and (5) means operated by the terminal one of said storage elements for terminating machine operation, an auxiliary means for terminating machine operation when an intermediate one of said storage elements is enabled which comprises the combination of:

(6) a plurality of ordinally arranged members co-ordinally arranged with said storage elements, (7) means for setting selected members in an operative position, (8) means for sensing whether the member co-ordinally corresponding to the enabled one of said storage elements is in an operative or inoperative position, and (9) means operated by said sensing means when sensing an operative position of the coordinal member for terminating machine operation.

5. In a calculating machine having a multiplication mechanism including:

(1) a plurality of ordinally arranged storage elements shiftable as a unit, (2) means for inserting values into said multiplier storage elements, (3) means controlled by an operative one of said multiplier storage elements for controlling the operation of said machine in a multiplication operation, (4) means for sequentially rendering said storage elements operative, (5) a multiplier control key, (6) means for latching said multiplier control key in an operative position, and (7) means operated by the terminal one of said storage elements, when operative, for releasing said latch, an auxiliary means for releasing said latch when an intermediate one of said storage elements is operative which comprises the combination of:

(8) a plurality of stops co-ordinally arranged with said storage elements, (9) means for setting selected ones of said stops elements from an inoperative to an operative position, (10) means for sensing whether the stop co-ordinally corresponding to the operative one of said storage elements is in an operative or inoperative position, and (11) means operated by said sensing means for operating said latch means to release said multiplier key.

6. In a calculating machine having:

(1) a selection mechanism, (2) an actuator mechanism, (3) a register shiftable with respect to said actuator, (4) means for shifting said register, (5) a multiplication mechanism including:

(a) a plurality of ordinally arranged storage members for storing a multiplier factor, (b) an indexing means for inserting values into said multiplier storage members, and (c) means controlled by said multiplier storage members for controlling the operation of said actuator and said shifting means to multiply a value standing in said selection mechanism by a value in said storage register, (6) a multiplier control key, (7) means for latching said multiplier control key in an operative position, and (8) means operated by the return of the multiplier carriage register to its home position for releasing said latch, an auxiliary means for releasing said latch prior to the return of the multiplier storage register to its home position comprising:

(9) a plurality of ordinally arranged members representative of the ordinal positions of said multiplier storage members, (10) means for setting said last-mentioned members from an inoperative to an operative position, (11) sensing means for sensing an operative member, and (12) means operated by said sensing means for operating said latching means to release said multiplier control key.

7. In a calculating machine having:

(1) a selection mechanism, (2) an actuator mechanism, (3) a register shiftable with respect to said actuator, (4) means for shifting said register, and (5) a multiplication mechanism including:

(a) an array of ordinally arranged storage elements shiftable as a unit, (b) an indexing means for inserting values into said multiplier storage elements, (c) means operated by said indexing means for shifting said array of elements from an inoperative to an operative position, (d) means controlled by the multiplier storage element in an operative position for controlling the operation of said actuator and said shifting means to multiply a value standing in said selection mechanism by the value in said multiplier storage elements and then return the array of multiplier storage elements toward an inoperative position, (e) a multiplier control key, (f) means for latching said multiplier control key in an operative position, and
(g) means operated by the return of the array of multiplier storage elements to its inoperative position for releasing said latch, an auxiliary means for releasing said latch with the array of multiplier storage elements in an intermediate position which comprises the combination of:

(6) a plurality of ordinally arranged pins carried by said array of multiplier storage elements and representative of the ordinal position of said elements,
(7) means for setting the pin in the operative position of said array of storage elements from an inoperative to an operative position,
(8) means for sensing an operative one of said pins when the array of multiplier storage elements is in the ordinal position represented by said pin, and
(9) means operated by said sensing means for operating said latching means to release said multiplier key.

No references cited.

LEO SMILOW, *Primary Examiner.*

UNITED STATES PATENT OFFICE
CERTIFICATE OF CORRECTION

Patent No. 3,214,094            October 26, 1965

Grant C. Ellerbeck

It is hereby certified that error appears in the above numbered patent requiring correction and that the said Letters Patent should read as corrected below.

Column 2, line 42, for "therefore" read -- therefor --; column 5, line 58, for "reapeated" read -- repeated --; column 9, line 63, for "bracyet" read -- bracket --; column 12, lines 11 and 12, strike out "elements"; line 18, for "latch" read -- latching --.

Signed and sealed this 12th day of July 1966.

(SEAL)
Attest:

ERNEST W. SWIDER
Attesting Officer

EDWARD J. BRENNER
Commissioner of Patents